April 16, 1929.  A. D. CROTHERS  1,709,779

STATIC ELECTRICITY ELIMINATOR FOR VEHICLES

Original Filed Oct. 24, 1925

ARTHUR D. CROTHERS
INVENTOR

PER
Albert J. Fihe
ATTORNEY

Patented Apr. 16, 1929.

1,709,779

UNITED STATES PATENT OFFICE.

ARTHUR D. CROTHERS, OF CHICAGO, ILLINOIS.

STATIC ELECTRICITY ELIMINATOR FOR VEHICLES.

Application filed October 24, 1925, Serial No. 64,702. Renewed August 24, 1928.

This invention relates to improvements in static electricity eliminators for trucks and the like, and has for one of its principal objects the provision of an automatically operated means whereby a charge of static electricity accumulated by a truck, automobile, or other vehicle in motion, is removed so as to prevent danger of explosion, fire, or the like.

One of the important objects of this invention is to provide an attachment for a truck or other vehicle chassis which is automatically operated when the truck or other vehicle is brought to a stop, so as to completely discharge and eliminate from the vehicle any accumulated charge of static electricity which might be present thereon, and the accidental discharge of which might occasion an explosion, fire, or other disaster.

Still another important object of this invention is to provide an attachment for vehicle brakes whereby, when the brake is applied, the attachment will automatically operate to discharge from the body of the vehicle any charge of static electricity which might be accumulated thereon during the operation or running thereof, or due to the friction resulting from the application of the brakes.

Other and further important objects of the invention will be apparent from the disclosures in the accompanying drawings and following specification.

The invention, in a preferred form, is illustrated in the drawings and hereinafter more fully described.

Figure 1:
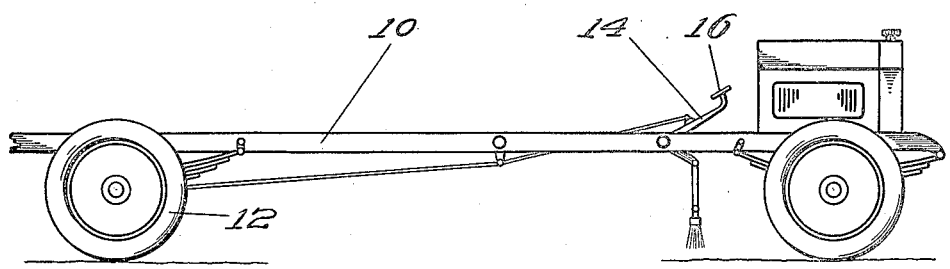
Figure 1 is a side elevation of a truck chassis, showing the improved static electricity eliminator of this invention as applied thereto.

The reference numeral 10 indicates generally the chassis of a truck or the like having wheels 12 and provided with the usual brake lever 14 operated by a foot pedal or the like 16.

Attached to the brake lever 14 is a depending element 18 which is so constructed as to be readily applied to the brake lever without any changes in the construction of the lever itself, and even without the necessity of drilling holes for attaching bolts or the like.

Pivoted to the lower end of the member 18 is a connecting rod 20, at the lower end of which is pivoted a brush support 22 having mounted therein bristles of steel, wire, or other suitable material.

Figure 2:
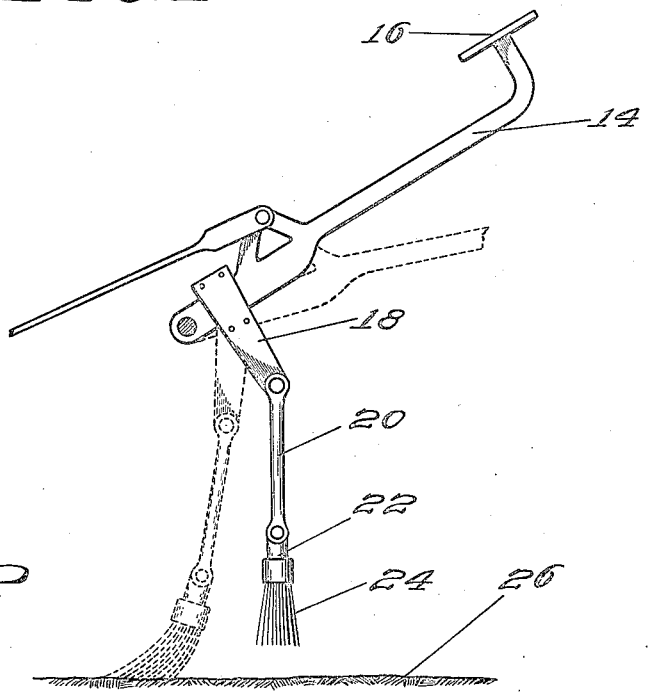
Figure 2 is an enlarged detail view showing the application of this device to the brake pedal of the truck itself.

Upon the application of the vehicle brake by depression of the pedal 16 the member 18 is moved into a vertical position and the corresponding members 20, 22, and 24 are accordingly depressed, as illustrated in the dotted lines in Figure 2, allowing the bristles 24 to come in contact with the roadway or pavement 26. This contact will effectively discharge any amount of static electricity which may have accumulated on the vehicle during its run, or perhaps due to the application of the brakes.

Heretofore such charges of static electricity have been the cause of disastrous fires, especially when the trucks or other vehicles were employed in carrying gasoline or other readily inflammable materials, the accumulated charge remaining on the vehicle due to the insulation of the rubber tires on the wheels 12, and when the nozzle of a discharge pipe or the like was applied to the truck a spark of considerable voltage immediately occurred and oftentimes set fire to the explosive materials with considerable resultant damage.

This has also occurred in passenger automobiles or similar vehicles when the same were driven up to a gasoline filling station for replenishment of the contents of the gasoline tank. The occurrence of the spark due to static discharge at the juncture of the edge of the gasoline tank and the filling nozzle very often resulted in considerable damage.

By the use of this invention such accumulated static electricity is positively and automatically discharged by the contact of the bristles 24 with the pavement 26, and any danger due to fire and explosion is positively eliminated.

Further, the device can be readily and economically manufactured and easily installed, thereby eliminating the necessity of the use of discharging devices which have heretofore been employed, but which are not always used due to forgetfulness.

I am aware that many changes may be made and numerous details of construction varied throughout a wide range without departing from the principles of this invention, and I therefore do not purpose limiting the patent granted thereon otherwise than as necessitated by the prior art.

I claim as my invention:

1. A static electricity eliminator for vehicles, including means for automatically closing an electrical contact between the vehicle and the ground upon application of the wheel brakes of the said vehicle.

2. A static electricity eliminator for vehicles, including means for automatically closing an electrical contact between the vehicle and the ground upon stoppage of the vehicle, said means comprising a discharge brush attached to the brake lever of said vehicle.

3. A static electricity eliminator for vehicles, including means for automatically closing an electrical contact between the vehicle and the ground upon application of the brakes of the said vehicle, said means including a discharge brush pivotally attached to the brake lever of the said vehicle.

In testimony whereof I affix my signature.

ARTHUR D. CROTHERS.